Sept. 22, 1959  J. H. MILLER ET AL  2,905,899
RANGE CHANGE CIRCUIT FOR MULTIRANGE ELECTRICAL INSTRUMENT
Filed July 11, 1955
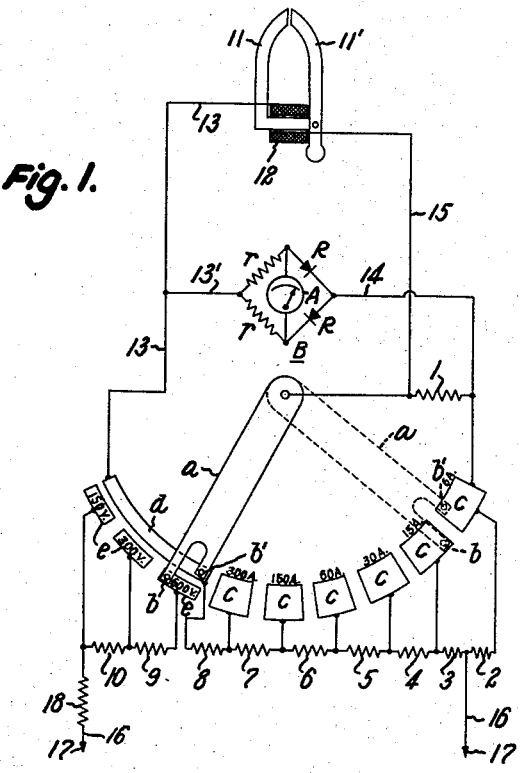
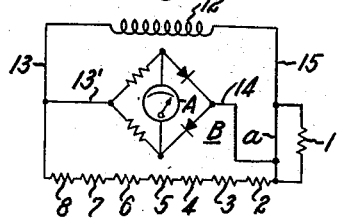
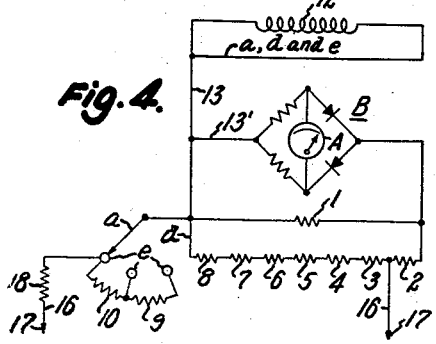
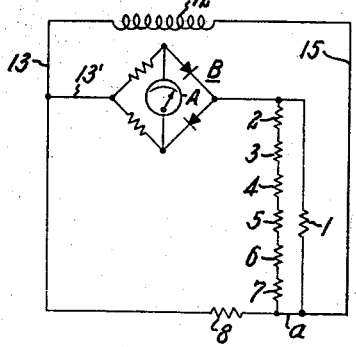
INVENTORS
JOHN H. MILLER and
ROYDEN F. ESTOPPEY
BY Rudolph F. Lanck
ATTORNEY

# United States Patent Office 2,905,899
Patented Sept. 22, 1959

2,905,899

RANGE CHANGE CIRCUIT FOR MULTIRANGE ELECTRICAL INSTRUMENT

John H. Miller, Short Hills, and Royden F. Estoppey, Berkeley Heights, N.J., assignors, by mesne assignments to Daystrom, Incorporated, Murray Hill, N.J., a corporation of New Jersey Application July 11, 1955, Serial No. 521,130

4 Claims. (Cl. 324—115)

This invention relates to a range change circuit for a multirange volt-ammeter, and more particularly to a range change circuit for an instrument of the type which includes a bridge rectifier and a sensitive direct current meter connected in the transformer secondary winding of a clamp-type volt-ammeter.

In such a circuit, the bridge rectifier which is a part of the burden on the transformer secondary winding displays an increasing resistance with decreasing alternating current input current to the bridge, and the efficiency of the transformer decreases at the lower flux densities developed by the lower primary currents. These factors are most effective on the lower current ranges and difficulty has been encountered in providing a resistance network for which one set of scale graduations is accurate for all current ranges.

Objects of the present invention are to provide a range change circuit for a multirange ammeter of the type stated which circuit makes it possible to use a single graduated scale that is accurate for a plurality of current ranges. Further objects are to provide a range change circuit for a rectifier type of clamp-on ammeter which also includes elements adapting the instrument for the accurate measurement of alternating voltages in different ranges.

These and other objects and the advantages of the invention will be apparent from the following specification when taken with the accompanying drawing illustrating an embodiment of the invention. It is to be understood that the drawing is for the purpose of illustration and is not to be construed as defining the scope or the limits of the invention, reference being had for the latter purpose to the appended claims.

In the drawings wherein like reference numerals denote like parts in the several views:

Figure 1 is a circuit diagram of a measuring instrument which includes a range change circuit embodying the invention;

Figures 2 and 3 are simplified equivalent diagrams of the circuit as adjusted for measurement in the lowest and the highest ranges of current values, respectively; and Figure 4 is a simplified equivalent diagram of the circuit as adjusted for voltage measurements.

The range change switch comprises an angularly movable blade $a$ having a contact area of substantial radial and angular extent or, as shown, radially and laterally spaced contact areas $b$ and $b'$. A plurality of current-measuring contacts $c$ are arranged in an arc about the axis of the blade $a$ and, as indicated by the legends, are each appropriate for measurements in a different current range. The contacts $c$ are of such radial extent as to be engaged by both contact areas of the blade, and are so spaced that the blade engages one contact before it separates from the adjacent one, as indicated by the dotted line position of the switch blade in Figure 1.

The lowest current range contact (at the extreme right as shown in Figure 1) is connected to the switch blade $a$ through a resistor 1, and to the adjacent contact $c$ by series resistors 2 and 3. Additional resistors 4—7 are connected serially between the other current-measuring contacts $c$ and the highest current range contact $c$ (at the left as shown in Figure 1) is connected through a resistor 8 to a conducting strip $d$ which is concentric with and radially alined with a plurality of voltage-measuring contacts $e$, which are serially connected by resistors 9 and 10.

The source of current to be measured is developed in a transformer comprising the clamp-on tongs 11 and 11', and a secondary winding 12. One terminal of the secondary winding 12 is connected by lead 13 to the conducting strip $d$ of the switch and a jumper 13' extends from that lead to one of the input terminals of a rectifier bridge B comprising a ring circuit of two fixed resistors $r$ and two rectifiers R. The other input terminal of the rectifier bridge is connected by a lead 14 to the lowest range current-measuring contact $c$, and the second terminal of the transformer secondary winding 12 is connected by a lead 15 to the switch blade $a$ and that end of resistor 1 which is remote from the lowest current-measuring contact $c$. A sensitive direct current ammeter A is connected between the pair of output terminals of the rectifier bridge B.

Leads 16 terminating in probes, indicated schematically by arrows 17, are connected to the highest voltage range contact $e$ and to the junction of resistors 2 and 3, respectively, and a voltage dropping resistor 18 is in series with one of said leads. The probes 17 may be applied to points in a circuit across which a voltage is to be measured when the switch blade is positioned as shown in solid line to engage one of the voltage-measuring contacts $e$.

Instrument A may be conditioned for measurement in a desired current or voltage range by setting the switch blade to the appropriate contact. The current measuring circuits for the lowest and the highest measuring ranges are shown in simplified form in Figures 2 and 3, respectively. For measurement in the lowest current range, the switch blade is moved slightly counterclockwise from the dotted line position of Figure 1 to engage only the 6 ampere range contact $c$. The secondary winding 12 is thereby connected across the bridge B which is then shunted by the serially connected resistors 2 to 8, with the resistor 1 shorted by the switch blade $a$. On adjustment of the blade $a$ to the highest current range contact $c$ the transformer secondary winding 12 is connected across only a portion of the serially-connected resistors; namely, the resistor 8; the balance of such serially-connected resistors 2 to 7 being in series with the rectifier bridge B. Additionally, the resistor 1 is connected across the resistors 2 to 7 thereby reducing the resistance that is in series with the bridge. As the blade $a$ is moved into engagement with successively lower current range contacts one or more of the resistors 7, 6, 5, etc. become part of the shunt across the transformer secondary winding resulting in a corresponding subtraction of the total resistance remaining in series with the bridge. Also, the resistor 1 is simultaneously shunted across successively fewer resistors and, therefore, such resistor becomes less effective in changing the net total resistance remaining in series with the bridge.

Thus, on the six (6) ampere current measuring range the effective resistance shunting the rectifier bridge comprises all the serially connected resistors 2 to 8. As the switch blade $a$ is moved progressively to the higher current range contacts the effective bridge-shunting resistance decreases due to the fact that the resistor 1 progressively is connected across an increasing number of the resistors 2 to 8. Such lowering of the effective shunt resistance across the bridge causes the direct-current output of the bridge rectifiers at the higher current ranges to read somewhat lower at the low end of the scale than would be the case if the bridge-shunting resistance remained constant. Such lower rectifier output, however, is required to make the higher current ranges track on a single scale having its calibration taken from the lowest (6 ampere) current range since the output of the transformer secondary is lowest at the 6 ampere range and becomes progressive as the range is increased. In this way, it is possible to compensate for the increasing rectifier resistance with decreasing alternating current input and for the lower transformer efficiency at low primary current. By proper selection of the resistors 2 to 8 the transformer output can be adjusted for the same full scale deflection on all current ranges and by proper selection of the resistor 1 the scale calibration can be maintained at the lower scale points on all current ranges.

Voltage values are measured by adjusting switch blade $a$ to set its contact area $b$ on a selected voltage-measuring contact $e$. When this is done, the blade contact area $b'$ engages the contact strip $d$ to complete a short circuit for the transformer secondary winding 12, thereby eliminating the possibility of high voltages developing across the winding.

The voltage ranges can also be made to track on the single ampere scale. As shown in Figure 4, the resistor 1, on voltage measurements, is connected across the entire set of serially connected resistors 2 to 8. It is to be noted that the resistance shunt across the rectifier bridge B includes the resistors 2 and 3 in series between the current-measuring contacts $c$ for the 6 and 15 ampere ranges, and that one of the voltage leads 16 is connected to the junction of resistors 2 and 3. The value of the voltage-dropping resistors 9, 10 and 18 is so chosen that the meter will read somewhat higher when the indicated voltage is applied across the leads 17 and the value of the resistor 2 is zero. The resistor 2 is then adjusted so as to bring the meter pointer into alignment with the top mark on the scale. Actually, the adjustment of the resistors 1 to 8 is interrelated but once these adjustments are properly determined minor changes can be made in the resistors 1 and 2 in order to correct for minor variations in the deflection characteristics of different instruments. By appropriate selection of the value of resistor 2, the resistive shunt across the rectifier bridge for voltage measurements may be made identical with that for current measurements in the 6 ampere range, thus insuring tracking of the instrument pointer for voltage measurements on the same graduated scale.

In one practical embodiment of the invention the transformer secondary winding 12 consisted of 4,400 turns having a resistance of 460 ohms, the indicating instrument A had a resistance of 70 ohms and a full scale sensitivity of 500 micro-amperes and the network resistors had the following values:

| Resistor: | Ohms |
|---|---|
| 1 | 3,000 |
| 2 | 0–300 |
| 3 | 3,700 |
| 4 | 700 |
| 5 | 250 |
| 6 | 125 |
| 7 | 40 |
| 8 | 40 |
| 9 | 220,000 |
| 10 | 110,000 |
| 18 | 110,000 |

An appropriate and preferred construction of the range change switch and resistance network is described and claimed in the co-pending application of R. F. Estoppey and F. M. Bender, Serial No. 513,484, filed June 6, 1955, now Patent No. 2,848,567.

Having now described our invention in accordance with the requirements of the patent statutes what we desire to protect by Letters Patent of the United States is set forth in the following claims.

We claim:

1. The combination with a direct current measuring instrument connected between one set of opposite terminals of a rectifier bridge, a transformer having a secondary winding with the ends connected respectively to the rectifier bridge at one of the terminals of the second set of opposite terminals and to the movable blade of a switch having a plurality of current-measuring contacts, for the measurement of a series of ranges from a highest current range to a lowest current range, said contacts being spaced along an arcuate path to be progressively engaged by said switch blade as it is moved from the highest current range contact to the lowest current range contact; of a range change resistance network connected to said switch contacts; said network comprising resistances serially connected between adjacent current-measuring contacts; circuit means including a resistor connected between the movable switch blade and the lowest current range contact so as to be adjustably included in the range change network as the switch blade is moved to compensate for the drop of transformer efficiency at low current values, a connection between the highest current range contact and that terminal of the rectifier bridge to which one end of the secondary is connected, and a connection between the lowest current range contact and the other of the terminals of said second set of opposite terminals.

2. The invention as recited in claim 1, wherein said blade has an effective width greater than the spacing of said current-measuring contacts, whereby said blade engages one of said contacts before it separates from the adjacent contact.

3. The invention as recited in claim 1, wherein said first mentioned connection includes an arcuate contact strip disposed along the arcuate path of said current-measuring contacts, in combination with a plurality of voltage-measuring contacts radially spaced from said contact strip, said blade having a radial length to engage simultaneously a selected voltage-measuring contact and said contact strip, thereby to short-circuit said transformer secondary, and means for impressing the voltage to be measured upon said instrument.

4. The invention as recited in claim 3, wherein said voltage-impressing means comprises resistances serially connected between said voltage-measuring contacts, circuit means for connecting one terminal of the voltage source to be measured to the highest voltage range contact, and circuit means for connecting the other terminal of the voltage source to the lowest current-measuring range contact, said last circuit means including a portion of the resistance connected between the lowest current-measuring range contact and the adjacent current-measuring range contact.

References Cited in the file of this patent

UNITED STATES PATENTS

| 1,132,322 | Fiego | Mar. 16, 1915 |
| 2,129,524 | Camilli | Sept. 6, 1938 |
| 2,167,162 | Terman | July 25, 1939 |
| 2,663,845 | Koch | Dec. 22, 1953 |
| 2,767,377 | Daschke | Oct. 16, 1956 |